(12) United States Patent
Aslam

(10) Patent No.: US 12,458,486 B2
(45) Date of Patent: Nov. 4, 2025

(54) BREAST IMPLANT

(71) Applicant: Mohammad Azhar Aslam, London (GB)

(72) Inventor: Mohammad Azhar Aslam, London (GB)

( * ) Notice: Subject to any disclaimer, the term of this patent is extended or adjusted under 35 U.S.C. 154(b) by 880 days.

(21) Appl. No.: 17/604,098

(22) PCT Filed: Apr. 17, 2020

(86) PCT No.: PCT/GB2020/050973
§ 371 (c)(1),
(2) Date: Oct. 15, 2021

(87) PCT Pub. No.: WO2020/212707
PCT Pub. Date: Oct. 22, 2020

(65) Prior Publication Data
US 2022/0202561 A1 Jun. 30, 2022

(30) Foreign Application Priority Data
Apr. 18, 2019 (GB) .................................. 1905549

(51) Int. Cl.
*A61F 2/12* (2006.01)
*A61F 2/00* (2006.01)

(52) U.S. Cl.
CPC ........ *A61F 2/12* (2013.01); *A61F 2002/0081* (2013.01); *A61F 2220/0016* (2013.01); *A61F 2250/0003* (2013.01)

(58) Field of Classification Search
CPC ...... A61F 2/12; A61F 2/52; A61F 2002/0081; A61F 2220/0016; A61F 2/0077
See application file for complete search history.

(56) References Cited

U.S. PATENT DOCUMENTS

| | | | | |
|---|---|---|---|---|
| 4,531,244 A | * | 7/1985 | Hamas | A61F 2/12 623/8 |
| 5,207,709 A | | 5/1993 | Picha | |
| 5,658,329 A | | 8/1997 | Purkait | |
| 6,203,570 B1 | * | 3/2001 | Baeke | A61F 2/12 623/7 |
| 2003/0205846 A1 | * | 11/2003 | Bellin | A61F 2/12 427/2.24 |
| 2005/0197698 A1 | * | 9/2005 | Schneider-Nieskens | A61F 2/52 623/7 |

(Continued)

FOREIGN PATENT DOCUMENTS

| | | |
|---|---|---|
| CN | 201949178 U | 8/2011 |
| FR | 2773716 A1 | 1/1998 |

(Continued)

*Primary Examiner* — Javier G Blanco
(74) *Attorney, Agent, or Firm* — Craft Chu PLLC; Andrew W. Chu

(57) ABSTRACT

A breast implant includes a smooth outer surface that is configured for permanent implantation. The breast implant has a three-dimensional deformable body which is substantially circular or substantially oval in plan view. The outer surface of the breast implant has a front side and a rear side. One or both of the front side and the rear side is provided with a plurality of ridges extending in a radial direction. Annular ridges and projections are optionally provided.

8 Claims, 2 Drawing Sheets

(56) References Cited

U.S. PATENT DOCUMENTS

| | | | |
|---|---|---|---|
| 2008/0154366 A1* | 6/2008 | Frank | A61F 2/0063 623/8 |
| 2009/0198333 A1 | 8/2009 | Becker | |
| 2010/0042212 A1* | 2/2010 | Van Epps | A61F 2/12 623/8 |
| 2012/0010706 A1 | 1/2012 | Schuessler | |
| 2015/0245902 A1* | 9/2015 | Becker | A61F 2/12 623/8 |

FOREIGN PATENT DOCUMENTS

| | | | | |
|---|---|---|---|---|
| GB | 2562726 A | * | 11/2018 | A61F 2/0063 |
| WO | 94 25078 A1 | | 11/1994 | |
| WO | 2012105736 A | | 9/2012 | |
| WO | WO-2018078446 A1 | * | 5/2018 | A61B 90/02 |
| WO | WO-2018155874 A1 | * | 8/2018 | A61F 2/00 |

\* cited by examiner

BREAST IMPLANT

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a breast implant configured for permanent implantation.

2. Description of Related Art Including Information Disclosed Under 37 CFR 1.97 and 37 CFR 1.98

Breast implants are used to augment the size of breasts or to replace a breast removed by surgery, for example. A temporary tissue expander is used if necessary to expand the tissue at the breast site: once the tissue has been expanded to a desired size, which may take two to six months, the tissue expander is replaced by a permanent breast implant.

Different considerations arise in the designs of tissue expanders and permanent breast implants. Importantly, tissue expanders are expandable over time (for example by inflation) to increase the stretching effect, whilst breast implants have a size and volume which is fixed prior to or during implantation.

WO 2018/078446 A1 discloses a tissue expander with a flexible shell having a shape and topography that facilitates uniform expansion and contraction of the tissue expander. The shell may include a series of topographical features such as ridges, grooves, channels, valleys, canals, protrusions, pleats, creases or folds. These features enable the tissue expander to expand uniformly (eg similar to bellows), promote even distribution of force against surrounding tissue and promote retention of the shape of the tissue expander when both expanded and contracted.

When a breast implant is placed in the soft tissue of a body, the body responds by isolating the breast implant: it does this by encapsulating the breast implant in a fibrous capsule of scar tissue. Problems can arise when the fibrous capsule starts to contract around the breast implant. Resultant squeezing of the breast implant can cause plain and lead to rupture of the breast implant.

U.S. Pat. No. 4,531,244 A discloses a mammary prosthesis where the surface of the prosthesis is provided with a plurality of rigid protuberances such as ridges, tubes and posts in such a way to avoid tissue ingrowth and attachment. The protuberances may be in one or more layers and may be covered with an outer envelope of inert elastomer which may be perforated or in the form of a web. The protuberances provide therebetween flow spaces such that when the scar capsule contracts and compresses the protuberances, the mammary prosthesis will have a space for displacement and remain soft.

A breast implant has a three-dimensional deformable body which is commonly substantially circular or substantially oval in plan view. Generally-speaking, breast implants are provided with a smooth or a textured outer surface. Textured breast implants have a rough surface that is sometimes compared to sandpaper. Unlike smooth-surfaced implants, their surface adheres to the tissue that surrounds them, preventing them from moving around within the implant pocket created by the surgeon.

Breast implants with smooth outer surfaces tend to lead to a greater incidence of problematic capsule contraction compared to implants with textured outer surfaces. Hence breast implants with textured outer surfaces have been preferred. Also a thinner fibrous capsule tends to be formed around a breast implant with a textured outer surface, such that the breast feels more pliable.

However, there is increasing evidence that breast implants with textured outer surfaces provide other problems, such as an increased risk of cancer, in comparison to breast implants with a smooth outer surface.

BRIEF SUMMARY OF THE INVENTION

The present invention relates to a breast implant having a smooth outer surface that is configured for permanent implantation.

A problem with such a breast implant is that the implant is liable to move by twisting or turning when implanted.

To solve this problem, the present invention provides a breast implant having a smooth outer surface that is configured for permanent implantation, the outer surface having a front side and a rear side. One or both of the front side and the rear side of the outer surface is provided with a plurality of ridges extending in a radial direction.

The breast implant has a three-dimensional deformable body which is preferably substantially circular or substantially oval in plan view. The back side of the outer surface of the breast implant is configured to face the chest wall of a body on implantation, whilst the front side is the opposite side located closest to the skin of the body. The back side may be substantially planar when the breast implant rests on a flat, horizontal, solid surface whilst the front side may be substantially dome-shaped in this resting position.

Both sides of the outer surface of the breast implant are smooth: neither side is textured.

A smooth outer surface of a breast implant means that the outer surface is manufactured with the intention to look smooth to a human eye and to feel smooth to human touch. Such an outer surface may have a non-smooth topography when viewed under a microscope due to the manufacturing techniques and conditions used. A textured outer surface of a breast implant means that the outer surface is manufactured with an intention not to look smooth to a human eye and not to feel smooth a human touch. A textured outer surface is generally pitted or uneven on a microscopic level.

The ridges provided on the outer surface of the breast implant preferably extend in a radial direction from a common point or from a common annulus. The common point or the common annulus may be provided at the approximate centre of the front side or the back side of the outer surface.

The common point or the common annulus may or may not project from the outer surface. The ridges may taper towards the common point or the common annulus such that the height of projection of the radial ridges reduces towards the common point or the common annulus. Alternatively, the ridges may flare towards the common point or the common annulus such that the height of projection of the radial ridges increases towards the common point or the common annulus.

The common point may be at an apex of the side. At least the front side may be provided with an apex to mimic a natural breast shape. The common point may therefore be provided at an apex of the front side of the outer surface.

The presence of the ridges projecting from the smooth outer surface of the breast implant provides anchoring of the breast implant to surrounding tissue to resist movement of the implant during and after surgical implantation. The ridges are therefore directly exposed to surrounding breast tissue. The breast implant is not provided with an outer layer for enveloping the ridges.

The ridges are designed to impart stability to the breast implant in horizontal, vertical, axial and circumferential directions. The radially-extending ridges increase the frictional resistance to rotation, making the position of the implant more stable.

The ridges also enhance the positional stability by engaging with the surrounding tissues. In particular, the provision of radially-extending ridges on the front side of the outer surface of the breast implant increases the rotational and anterior/posterior stability of the implant by resisting the rotational and gravitational displacement forces at different junctures, and at different points.

The displacement forces acting on the implanted breast implant will be re-distributed in an asymmetric fashion, therefore breaking the strength of the displacement forces, in vertical, horizontal, axial and circumferential directions, into smaller magnitudes.

After implantation of the breast implant, when the fibrous capsule is subsequently being formed by the body, the enveloping scar tissue forms around the ridges, thereby securing the implant whilst aiming to reduce the thickness of the resulting fibrous capsule. The ridges are therefore spaced to accommodate tissue penetration.

A plurality of ridges is provided. Four to twelve ridges on the front and/or back side of the outer surface is preferred, but fewer than four ridges and greater than twelve ridges may be provided on the relevant side. Preferably, four to eight ridges are provided on the front and/or back side of the outer surface.

When the plurality of ridges meets at the common point or the common annulus, on the front side or the back side of the outer surface of the breast implant, this provides for improved fixation of the implant. When the ridges are provided on the front side of the outer surface of the breast implant, the meeting point of the ridges at the common point or the common annulus is preferably configured to be implanted beneath the nipple area of the breast where there is a relatively large mass of tissue, thereby providing enhanced fixation of the implant.

The ridges have a length longer than their width: they may have a length of 30 to 90 mm, they may have a width of 2 to 5 mm and they may have a height of 2 to 5 mm above the smooth outer surface of the breast implant. The height and/or width of a ridge may vary along its length. Each ridge is preferably continuous along its length but it may be semi-continuous.

In one embodiment the ridges have an inverted V-shape in cross-section (eg a triangular shape), although other cross-sectional shapes are envisaged such as an n-shape (eg a square, oval or rectangular shape).

Each ridge is preferably designed so that in cross section it is shaped to have a wider base and a pointed top (eg a triangular shape). This design provides engagement with the body tissues is at an acute angle, providing relative rigidity at the base and minimal contact at the top, such that the smooth texture and the feel of the implant is not adversely affected.

The ridges provided on a breast implant may have different lengths, widths, heights and cross-sectional shapes to one another.

The ridges radiate in a direction outward from, for example, the common point or the common annulus provided on the front and/or back side of the outer surface of the breast implant: the ridges are disposed at regular and/or irregular circumferential intervals around this common point or common annulus.

In one embodiment, the ridges are disposed at regular circumferential intervals around the common point or common annulus: where four ridges are provided on the front or back side, they may be disposed at intervals of approximately 90 degrees relative to one another; where six ridges are provided on the front or back side, they may be disposed at intervals of approximately 60 degrees relative to one another; where eight ridges are provided on the front or back side, they may be disposed at intervals of approximately 45 degrees relative to one another; and where twelve ridges are provided on the front or back side, they may be disposed at intervals of approximately 30 degrees relative to one another However, the ridges may be disposed at any angles relative to one another. The ridges are not disposed in parallel to one another.

Since the invention provides a breast implant with a smooth outer surface rather than with a textured outer surface, the surface area of the smooth outer surface of the breast implant covered by the ridges may be less than 10%, preferably less than 5%, more preferably less than 3%. This ensures that the smooth texture and the feel of the implant is not adversely affected.

In addition to the ridges extending in a radial direction, the circumference of the breast implant, where the front and back sides of the outer surface meet, may be provided with an annular ridge.

Alternatively or in addition to the annular ridge at the circumference of the breast implant, an annular ridge may be provided on the front side and/or the back side of the outer surface of the breast implant: this annular ridge joins the radial ridges (if present on the side in question) and extends circumferentially.

When two or more such annular ridges are provided on one side they are preferably concentric. No more than two to four such annular ridges are envisaged on each side. Preferably only one annular ridge is provided on each side (in addition to any annular ridge at the circumference of the breast implant). This annular ridge may be the common annulus, where present. Preferably the radially-extending ridges are not joined together other than by any annular ridges.

The or each annular ridge, including any annular ridge at the circumference of the breast implant, may have a length of 60 to 250 mm, preferably 100 to 200 mm; it may have a width of 2 to 5 mm and it may have a height of 2 to 5 mm. The height and/or width of an annular ridge may vary along its length. Each annular ridge is preferably continuous along its length but may be semi-continuous.

In accordance with the radially-extending ridges, the or each annular ridge may have an inverted V-shape in cross-section (eg a triangular shape), although other cross-sectional shapes are envisaged such as an n-shape (eg a square, oval or rectangular shape). The or each annular ridge is preferably designed so that in cross section it is shaped to have a wider base and a pointed top.

In one embodiment, at least the front side of the outer surface of the breast implant is provided with the plurality of radially-extending (ie radial) ridges. Optionally one or more annular ridges are present on the front side and/or the back side and/or at the circumference of the breast implant.

In another embodiment, the front side of the outer surface of the breast implant is provided with the plurality of radial ridges and the back side of the outer surface of the breast implant is provided with the plurality of radial ridges. The number of ridges on the front side and the back side may be the same or different. Optionally one or more annular ridges are present on the front side and/or the back side and/or at the circumference of the breast implant.

In a further embodiment, the front side of the outer surface is provided with a plurality of ridges extending in a radial direction from a common point, and the rear side of the outer surface is provided with a plurality of ridges extending in a radial direction from a common annulus. Optionally one or more annular ridges are present. In one example, the annular ridge at the circumference of the breast implant is present, together with an annular ridge on the front side extending around the common point, and the common annulus on the rear side provides another annular ridge.

The breast implant of the present invention is configured to have integral ridges. This means that the ridges are not provided separately to the breast implant and no separate backing plate is required when the breast implant is in use. Moreover, the breast implant is not provided with any channels, grooves or valleys.

The breast implant itself has a cross-sectional shape which is generally oval or teardrop-like. The thickness of the outer surface of the implant may be 0.1 to 0.8 mm. The breast implant, in one example, has a diameter of approximately 120 mm and a height of approximately 35 mm. The dimensions and volume of the breast implant are selected depending on the resulting breast size desired.

The breast implant is made from a medical grade biocompatible deformable material such as a silicone elastomer and is filled with an inert fluid material such as silicone gel or hyaluronic acid.

The breast implant is configured for permanent implantation and is therefore not expandable or inflatable once implanted.

The ridges are preferably made from the same material as the breast implant and are therefore generally deformable rather than rigid. The radial and/or annular ridges are preferably formed integrally with the outer surface of the breast implant.

Projections may be provided on the outer surface of the breast implant to press the breast implant against the surrounding tissue and/or to enable suturing (eg stitching) to surrounding tissue: preferably the number of projections provided on the outer surface is less than 10 and may be in the range of 2 to 8. In one example, the front side of the outer surface is provided with 1 to 5 projections and the rear side is provided with one projection, with a projection on the front side and the projection on the rear side each being located at the approximate centre of the relevant side. The projections are directly exposed to surrounding breast tissue. The breast implant is not provided with an outer layer for enveloping the projections.

Any projections may be provided at sites on the outer surface of the breast implant where there is a radial ridge and/or an annular ridge. The projection protrudes from the height of the radial ridge and/or the annular ridge. Such a projection may have a height of about 2 or 3 mm above the height of the radial and/or annular ridge. Preferably, one or more projections are provided at sites on the outer surface of the breast implant where there is a radial ridge and/or an annular ridge.

In preferred embodiments, at least the front side of the outer surface is provided with 1 to 9 projections, either with all of the projections being provided at sites on the outer surface of the breast implant where there is a radial ridge and/or an annular ridge, or with one of these projections being provided at a site on the outer surface where there is not a radial ridge and/or an annual ridge and the remaining projections being provided at sites on the outer surface of the breast implant where there is a radial ridge and/or an annular ridge.

The projections preferably extend in a direction which is substantially perpendicular to the smooth outer surface of the breast implant, whether they are provided at sites on the outer surface of the breast implant where there is a radial ridge and/or an annular ridge or whether they are provided at sites on the outer surface of the breast implant where there is not a radial ridge and/or an annular ridge.

In one embodiment, the front side of the outer surface of the breast implant is provided with the plurality of (eg four to eight) radial ridges meeting at a common point, optionally provided with a single projection: a projection is provided on two or more (eg two to eight) of the radial-extending ridges at a distance of 15 to 35 mm, preferably of 20 mm to 30 mm, from the common point: an annular ridge with a radius of 15 mm to 35 mm, preferably of 20 mm to 30 mm, may also be provided on the front side, having its axis at the common point.

The radial ridges, any annular ridges and any projections provide frictional resistance against movement of the implant and also provide engagement with surrounding tissue. This configuration of the front side of the outer surface is designed to enhance the stability of the implant at the central part of the breast where there is maximum breast tissue. The rear side of the outer surface may also be provided with radial ridges and/or annular ridges and/or projections.

The surface area of the smooth outer surface of the breast implant covered by the ridges, any annular ridges and any projections may be less than 10%, preferably less than 5%, more preferably less than 3%. This ensures that the smooth texture and the feel of the implant is not adversely affected.

A barbed thread may be anchored at one end to the front side or to the rear side of the outer surface at a site where there is a radial ridge and/or an annular ridge.

A barbed thread may be anchored at one end to the front side or to the rear side of the outer surface to a projection located at a site where there is a radial ridge and/or an annular ridge.

The breast implant of the present invention may be provided with one or more barbed threads which can be used to thread a needle which is passed through breast tissue (and cut where it exits the breast) to anchor the implant and provide additional stability. The barbed threads may be provided with uni or bi-directional cogs or barbs, such as those commonly used in procedures to tighten and lift facial skin. A barbed thread may be anchored at one end on a projection and/or on a radial ridge and/or on annular ridge.

In one example, four barbed threads are provided on the front side of the outer surface, spaced at an interval of approximately 90 degrees to one another. Each barbed thread is anchored to a projection which is located at a site where a radial ridge and an annular ridge meet.

BRIEF DESCRIPTION OF THE SEVERAL VIEWS OF THE DRAWINGS

Embodiments of the present invention will now be described, by way of example only, with reference to the accompanying diagrammatic drawings.

DETAILED DESCRIPTION OF THE INVENTION

Figure 1:
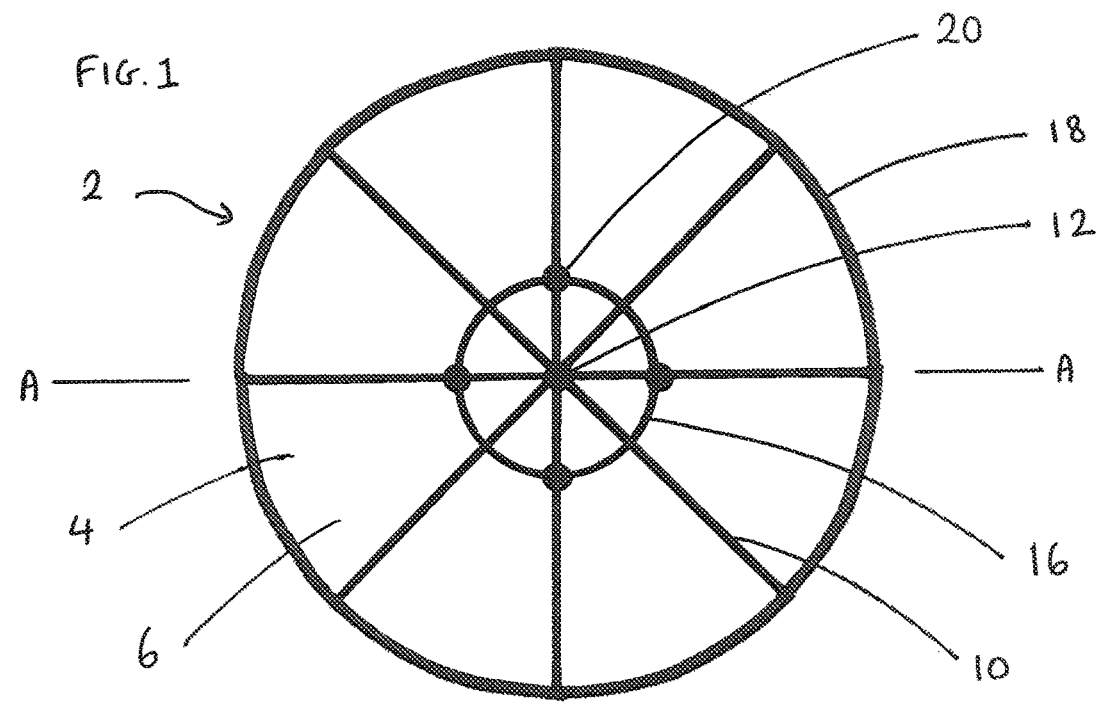
FIG. 1 is a plan view of the front of a breast implant in a first embodiment showing the front side of the outer surface.
Figure 2:
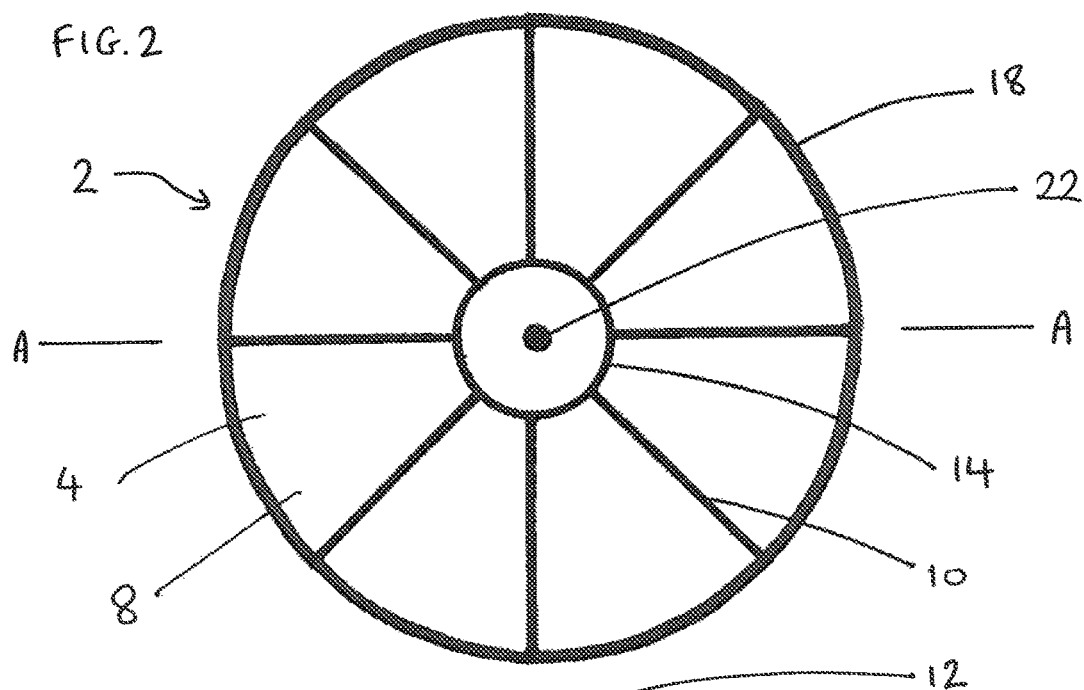
FIG. 2 is a plan view of the rear of the breast implant of the first embodiment showing the rear side of the outer surface.
Figure 3:
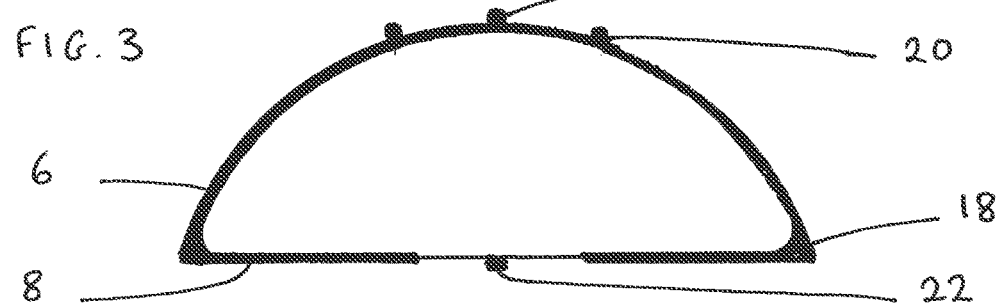
FIG. 3 is a vertical cross-sectional view of the breast implant of the first embodiment taken along lines A-A in FIGS. 1 and 2.

Referring to the FIGS. 1 and 2, breast implant 2 is circular in plan view. An outer surface 4 of the breast implant has a front side 6 and a rear side 8. As shown in FIG. 3, front side 6 of the outer surface of the breast implant is dome-shaped and rear side 8 is flat, when the breast implant is placed on a flat surface. The body of the breast implant is deformable and may adopt other shapes, based on the dome-shape, when implanted.

Front side 6 and rear side 8 of outer surface 4 are each provided with eight ridges 10 extending in a radial direction. These radial ridges project from the outer surface. Each ridge is disposed at an angle of approximately 45 degrees to an adjacent ridge.

On front side 6, as shown in FIG. 1, the ridges extend in a radial direction from a common point where a projection 12 is provided having a greater height than the surrounding ridges. It is not essential for this projection to be provided.

In another embodiment, the meeting point of the ridges at the common point provides a projecting region. In yet another embodiment, the meeting point of the ridges at the common point provides a non-projecting region, for example due to an absence of ridge material or to the height of the ridges tapering towards the common point.

On rear side 8, as shown in FIG. 2, the ridges extend in a radial direction from a common annulus 14. In this embodiment, the common annulus 14 is an annular ridge projecting from the outer surface. In another embodiment, the common annulus 14 is not an annular ridge and does not project from the outer surface, for example due to an absence of ridge material or to the height of the ridges tapering towards the common annulus.

Another annular ridge 16, projecting from the outer surface, is provided on front side 6 as shown in FIG. 1. This annular ridge may have a radius of 15 to 35 mm, preferably 20 to 30 mm, and has its axis at projection 12.

An annular ridge 18 is provided at the circumference of the breast implant, where the front and back sides of the outer surface meet. This annular ridge projects from the outer surface.

Referring to FIG. 1, at four of the eight points where annular ridge 16 meets radial ridges 10, a projection 20 is provided having a greater height (eg by 2 or 3 mm) than the surrounding ridges.

A thread, preferably a barbed thread, is attached to projection 20 for suturing the implant to tissue breast on implantation.

Referring to FIG. 2, projection 22 is provided at the axis defined by the common annulus 14. This projection has a height which is the same as or greater than the height of the surrounding annular ridge (eg by 2 or 3 mm).

It is optional whether threads are attached to projections 20 or 22.

If threads are provided, they may instead be attached to opposing points on circumferential annular ridge 18, for example.

Whilst FIG. 1 shows an arrangement of radial and annular ridges on the front side of the outer surface of the breast implant, this arrangement may in addition or instead be used on the rear side of the outer surface.

Whilst FIG. 2 shows an arrangement of radial and annular ridges on the rear side of the outer surface of the breast implant, this arrangement may in addition or instead be used on the front side of the outer surface.

Projections 12, 20 and 22 are optional, as are annular ridges 14, 16 and 18.

Figure 4:
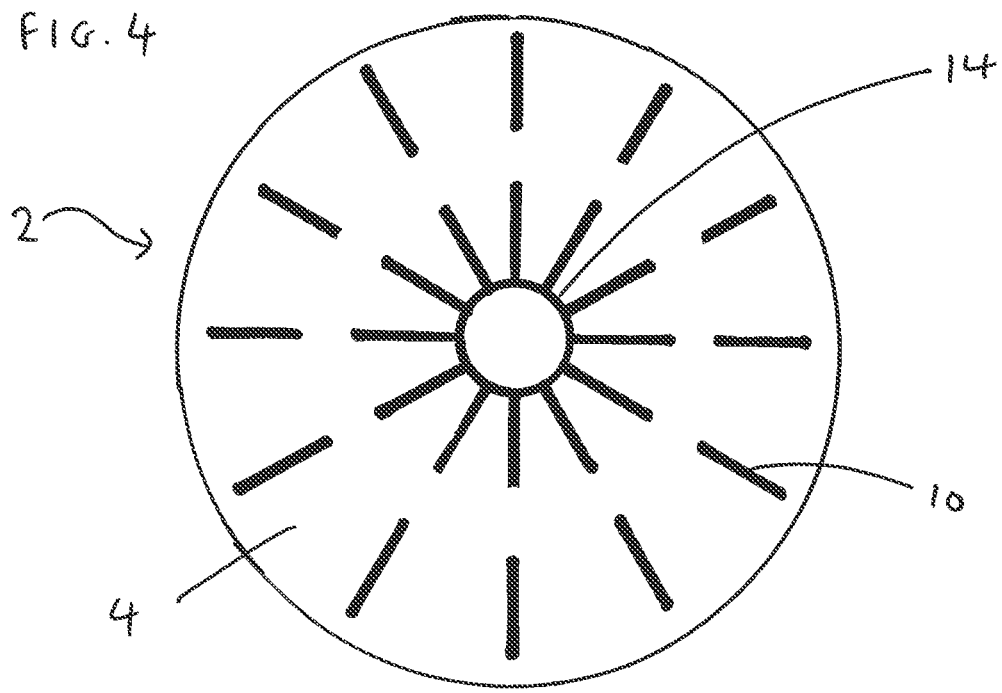
FIG. 4 is a plan view of the front or the rear of a breast implant in a second embodiment showing the front side or the rear side of the outer surface, as appropriate.
Figure 5:
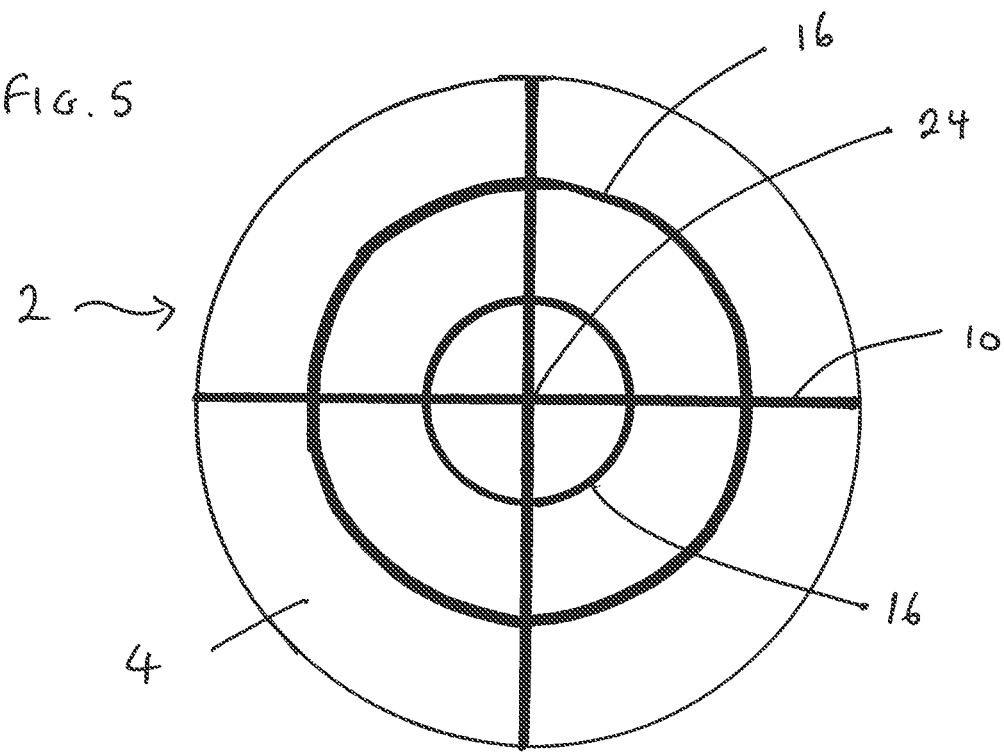
FIG. 5 is a plan view of the front or the rear of a breast implant in a third embodiment showing the front side or the rear side of the outer surface, as appropriate.

FIGS. 4 and 5 show second and third embodiments of the invention where the illustrated arrangements of radial and annular ridges may be used on the front side and/or the rear side of the outer surface of the breast implant.

FIG. 4 shows a front side or a rear side having common annulus 14 being an annular ridge. Twelve ridges 10 extend in a radial direction from common annulus 14. Each ridge, in this example, is not continuous along its length as a break point is provided. Moreover each ridge does not extend to the circumference of the breast implant where the front side meets the rear side.

FIG. 5 shows a front side or a rear side having four ridges 10 extending in a radial direction from a common point 24 where no projection is provided above the height of the ridges. Two concentric annular ridges 16 are provided. Each ridge extends to the circumference of the breast implant where the front side meets the rear side.

In the embodiments of FIGS. 4 and 5, no annular ridge is provided at the circumference of the breast implant where the front side meets the rear side.

A projection may be provided at one or more points where a radial ridge meets an annular ridge, optionally for a thread (eg a barbed thread) to be attached thereto.

The arrangements of radial ridges, annular ridges, projections and threads described and shown in the embodiments of the invention do not limit the invention: other arrangements and combinations of these features are envisaged, as long as the outer surface, on at least one of the front side and the rear side, is provided with a plurality of ridges extending in a radial direction.

I claim:

1. A breast implant, comprising:
   a smooth outer surface that is configured for permanent implantation, the outer surface of the breast implant having a dome-shaped front side, a flat rear side, and an annular ridge projecting from a circumference of the breast implant,
   wherein the front side of the outer surface is provided with a plurality of ridges extending in a radial direction from a common point to the annular ridge, the common point provided at the center of the dome-shaped front side,
   wherein the rear side of the outer surface is provided with a plurality of ridges extending in a radial direction from a common central annulus to the annular ridge,
   wherein one or more annular ridges are provided extending circumferentially on one or both of the front side and the rear side of the outer surface;
   one or more projections on the outer surface; and
   one or more barbed threads configured to be anchored to breast tissue,
   wherein one of said one or more projections is provided on the outer surface where there is a radially-extending ridge,
   wherein at least one of the one or more barbed threads is anchored at one end to the front side or to the rear side of the outer surface at a site where there is a radially-extending ridge or an annular ridge, and
   wherein the outer surface has a surface area covered by the ridges less than 10%.

2. The breast implant as claimed in claim 1, wherein the surface area covered by the ridges is less than 5%.

3. The breast implant as claimed in claim 1, wherein the ridges are disposed at substantially regular circumferential intervals.

4. The breast implant as claimed in claim 1, wherein one of said one or more projections is provided on the outer surface where there is an annular ridge.

5. The breast implant as claimed in claim 1, wherein the at least one of the one or more barbed threads is anchored at one end to a projection provided on the outer surface.

6. The breast implant as claimed in claim 1, wherein one of said one or more projections and another projection are provided on two or more of the radial-extending ridges of the plurality of ridges at a distance of 15 mm to 35 mm from the common point.

7. The breast implant as claimed in claim 6, wherein at least one projection is provided at the site of the common point.

8. The breast implant as claimed in claim 1, wherein the implant is filled with hyaluronic acid.

* * * * *